United States Patent
Park et al.

(10) Patent No.: US 12,221,561 B2
(45) Date of Patent: Feb. 11, 2025

(54) HOT MELT ADHESIVE COMPOSITION

(71) Applicant: LG Chem, Ltd., Seoul (KR)

(72) Inventors: Yong Su Park, Daejeon (KR); Tae Yun Kim, Daejeon (KR); Seungwhan Oh, Daejeon (KR); Jin Young Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1111 days.

(21) Appl. No.: 16/957,891

(22) PCT Filed: Dec. 11, 2018

(86) PCT No.: PCT/KR2018/015648
§ 371 (c)(1),
(2) Date: Jun. 25, 2020

(87) PCT Pub. No.: WO2019/132322
PCT Pub. Date: Jul. 4, 2019

(65) Prior Publication Data
US 2021/0054249 A1 Feb. 25, 2021

(30) Foreign Application Priority Data
Dec. 27, 2017 (KR) .................. 10-2017-0181535

(51) Int. Cl.
  *C09J 153/02*  (2006.01)
  *C09J 5/06*  (2006.01)
  *C09J 11/08*  (2006.01)

(52) U.S. Cl.
  CPC ............. *C09J 153/02* (2013.01); *C09J 5/06* (2013.01); *C09J 11/08* (2013.01); *C09J 2301/304* (2020.08); *C09J 2301/414* (2020.08); *C09J 2425/00* (2013.01)

(58) Field of Classification Search
None
See application file for complete search history.

(56) References Cited

U.S. PATENT DOCUMENTS

| | | |
|---|---|---|
| 6,162,859 A | 12/2000 | Lu et al. |
| 6,486,229 B1 | 11/2002 | Hu et al. |
| 8,378,015 B2 | 2/2013 | He et al. |
| 8,987,372 B2 | 3/2015 | Hu et al. |
| 2010/0210163 A1 | 8/2010 | He et al. |
| 2015/0159060 A1 | 6/2015 | Hu et al. |
| 2015/0203725 A1* | 7/2015 | Stafeil .............. C09J 153/02 524/505 |
| 2016/0040047 A1 | 2/2016 | Inoue et al. |
| 2016/0068721 A1 | 3/2016 | Malcolm et al. |
| 2016/0068723 A1* | 3/2016 | Moriguchi .......... B32B 37/1207 156/60 |
| 2018/0016478 A1 | 1/2018 | Moriguchi |
| 2018/0100091 A1* | 4/2018 | Sugimoto ............. C09J 11/06 |

FOREIGN PATENT DOCUMENTS

| | | |
|---|---|---|
| EP | 1466953 A1 | 10/2004 |
| EP | 1411100 B1 | 6/2008 |
| JP | 2004137297 A | 5/2004 |
| JP | 2014508832 A | 4/2014 |
| JP | 2016153448 A | 8/2016 |
| JP | 2017503069 A | 1/2017 |
| KR | 20070020835 A | 2/2007 |
| KR | 101331701 B1 | 11/2013 |
| KR | 20160010462 A | 1/2016 |
| KR | 101706869 B1 | 2/2017 |
| WO | 2015109160 A1 | 7/2015 |
| WO | 2016170796 A1 | 10/2016 |

OTHER PUBLICATIONS

Search report from International Application No. PCT/KR2018/015648, mailed Apr. 2, 2019.
Extended European Search Report with Written Opinion for Application No. 18896021.5 dated Aug. 18, 2020, 9 pages.
Kraton D1162 P Polymer is a clear triblock copolymer based on styrene and isoprene with a polystyrene content of 43 %. It is supplied from North America in the physical form as Kraton D1162 PT—Supplied as dusted dense pellet. Retrieved on Oct. 27, 2022, pp. 1-3.
Asaprene T-438 SBS:Styrene thermoplastic elastomer, is a block copolymer of styrene and butadiene. It is used in a wide range of applications as a styrene-based thermoplastic elastomer with the greatest demand, excellent rubber-like properties, compatibility with resins such as polystyrene, moldability, etc. Retrieved on Oct. 27, 2022, pp. 1-2.
Asaprene T-439 SBS: Styrene thermoplastic elastomer. Asaplen T-439 is a polymer suitable for adhesive applications In which asaplen T-438 is further fluidized. The product is supplied in pellet form. Retrieved on Oct. 27, 2022, pp. 1-2.
Exxon Mobil, Escorez TM 5637, Escorez TM 5600 series resins are very light color aromatic modified, cycloaliphatic hydrocarbon resins. They are designed to tackify a variety of adhesive polymers including EVA, and SBS block copolymers and metallocene polyolefins. Retrieved on Apr. 20, 2020, pp. 1-3.

* cited by examiner

*Primary Examiner* — Samir Shah
(74) *Attorney, Agent, or Firm* — Lerner David LLP

(57) ABSTRACT

A hot-melt adhesive composition includes a styrene-butadiene-styrene triblock copolymer and a styrene-isoprene-styrene triblock copolymer. The hot-melt adhesive composition enables melt processing at a relatively low temperature because of having a low viscosity properties are property and thus exhibits excellent adhesive strength and heat resistance while improving the processability. In particular, the melt adhesive composition has excellent mechanical properties after curing, and thus can be used in various industrial fields.

12 Claims, No Drawings

HOT MELT ADHESIVE COMPOSITION

CROSS-REFERENCE TO RELATED APPLICATION(S)

The present application is a national phase entry under 35 U.S.C. § 371 of International Application No. PCT/KR2018/015648 filed Dec. 11, 2018, which claims priority from Korean Patent Application No. 10-2017-0181535 filed with Korean Intellectual Property Office on Dec. 27, 2017, the entire contents of which are incorporated herein by reference.

TECHNICAL FIELD

The present invention relates to a hot melt adhesive composition.

BACKGROUND ART

A hot melt adhesive is a thermoplastic resin that is melted by heat, thereby forming an adhesive surface. Unlike conventional UV curing adhesives, the hot melt adhesives do not use volatile solvents and emit fewer harmful substances during curing, and thus are preferred as environmentally friendly high-functional adhesives.

Since the hot melt adhesive is relatively inexpensive compared to the UV-curing adhesive and is also present in a liquid state at a high temperature, it can be easily applied and pressed onto a substrate or an adherend, and then cooled and solidified at room temperature within several seconds to exhibit adhesive strength, thereby being easy to use.

The hot melt adhesive includes a thermoplastic polymer as a base resin, and a tackifier, a viscosity modifier, and the like are generally added thereto.

As the base resin, an olefin-based copolymer having excellent flexibility and a low unit price, an unsaturated aromatic copolymer, an unsaturated aromatic elastic copolymer, and the like are widely used.

This hot melt adhesive is applied to the adherend surface in a molten state, and then cooled to form a hard phase having cohesiveness and creep resistance. Therefore, it is widely used in various industrial fields such as for diapers, industrial tapes, packaging tapes, feminine hygiene products, as a pressure-sensitive adhesive for electronics applications, and for structural materials.

Since the hot melt adhesive contains a base resin, an additive, and the like, there may be a problem that phase separation and a bleeding phenomenon occur due to incompatibility and the like, and the adhesive strength is lowered. In addition, the hot melt adhesive has high viscosity and thus requires relatively high temperature conditions during melt processing for adhesion. In particular, under such processing temperature conditions, problems such as viscosity change, odor generation, discoloration, and the like may occur, and the demand for low viscosity products with relatively a low melting temperature is increasing.

However, the low viscosity hot melt adhesive capable of processing at a low temperature has a problem in that the viscosity retention rate is lowered, the adhesive strength is deteriorated, and the heat resistance such as a softening point is low.

Therefore, there is a need to develop a hot melt adhesive that not only maintains the low viscosity property and improves the processability, but also has excellent adhesive strength and heat resistance, and further has excellent mechanical properties after curing.

DETAILED DESCRIPTION OF THE INVENTION

Technical Problem

An object of the present invention is intended to provide a hot melt adhesive which enables melt processing at a relatively low temperature because of having a low viscosity property, and thus exhibits excellent adhesive strength and heat resistance while improving the processability, and particularly is excellent in mechanical properties after curing.

Technical Solution

In order to achieve the above objects, the present invention provides a hot melt adhesive composition including:
- A1) a styrene-butadiene-styrene triblock copolymer, wherein
  - a1) a content of the styrene-based unit is 30 to 50 wt %,
  - a2) a diblock content is at least 55% by weight, and
  - a3) a melt flow index measured according to ASTM D1238 is 30 g/10 min or more;
- A2) a styrene-isoprene-styrene triblock copolymer, wherein
  - a21) a content of the styrene-based unit is 30 to 50 wt %, and
  - a22) a diblock content is less than 5% by weight;
- B) a tackifier, and
- C) a plastic oil,
wherein the hot melt adhesive composition has a softening point measured according to the ASTM D36 standard of 85° C. or higher.

The present invention also provides an adhesive member including:
- a substrate; and
- an adhesive layer formed on at least one side of the substrate, and formed by the above-mentioned hot melt adhesive composition.

Advantageous Effects

According to the melt adhesive composition according to the present invention, melt processing can be performed at a relatively low temperature as low viscosity properties are maintained, and thereby it has excellent adhesive strength and heat resistance while improving the processability. In particular, the melt adhesive composition has excellent mechanical properties after curing, and thus can be used in various industrial fields.

DETAILED DESCRIPTION OF THE EMBODIMENTS

The hot melt adhesive composition according to one aspect of the present invention includes:
- A1) a styrene-butadiene-styrene triblock copolymer, wherein
  - a1) a content of the styrene-based unit is 30 to 50 wt %,
  - a2) a diblock content is at least 55% by weight, and
  - a3) a melt flow index measured according to ASTM D1238 is 30 g/10 min or more;
- A2) a styrene-isoprene-styrene triblock copolymer, wherein a21) a content of the styrene-based unit is 30 to 50 wt %, and
a22) a diblock content is less than 5% by weight;
B) a tackifier, and
C) a plastic oil,
wherein the hot melt adhesive composition has a softening point measured according to the ASTM D36 standard of 85° C. or higher.

According to one embodiment of the present invention, the hot melt adhesive composition may have a melt viscosity at 140° C. of 7000 cPs or less, preferably about 6400 cPs or less, or about 5500 to about 6500 cPs, and a viscosity change rate at 160° C. of 15% or less.

The styrene-isoprene-styrene triblock copolymer contained in the hot melt adhesive composition may have a melt flow index measured according to the ASTM D1238 standard of about 30 to about 50 g/10 min.

In addition, the hot melt adhesive composition preferably has a tensile strength value of about 1 $N/mm^2$ or more, preferably about 1.1 $N/mm^2$ or more, and more preferably about 1.1 to about 1.5 $N/mm^2$, when preparing a test specimen according to the ASTM D638 standard.

The styrene-isoprene-styrene triblock copolymer may be included in an amount of about 1 to about 30 parts by weight, preferably about 10 to about 25 parts by weight, based on 100 parts by weight of the styrene-butadiene-styrene triblock copolymer.

The tackifier contained in the hot melt adhesive composition may include any one or more of an at least partially hydrogenated rosin ester-based compound and an at least partially hydrogenated dicyclopentadiene-based polymerized petroleum resin.

The tackifier may be included in an amount of about 200 to about 400 parts by weight, or about 250 to about 350 parts by weight, based on 100 parts by weight of the styrene-butadiene-styrene triblock copolymer and the styrene-isoprene-styrene triblock copolymer.

The plastic oil may include a petroleum-based mineral oil.

The plastic oil may be included in an amount of about 50 to about 150 parts by weight based on 100 parts by weight of the styrene-butadiene-styrene triblock copolymer and the styrene-isoprene-styrene triblock copolymer.

Meanwhile, according to another aspect of the present invention, an adhesive member is provided, including:
a substrate; and
an adhesive layer formed on at least one side of the substrate and formed by the above-mentioned hot melt adhesive composition.

At this time, the thickness of the adhesive layer may be about 10 to about 100 μm, preferably about 30 to about 70 μm.

The adhesive member may have a T-peel strength value according to the ASTM D1876 standard of 10 N/in or more, preferably about 10 to about 15 N/in, or about 10 to about 12 N/in.

Further, the terms used herein are used only to explain illustrative examples, and are not intended to limit the invention.

A singular expression includes a plural expression unless clearly meaning otherwise.

It should be understood that the terms "comprise", "include", and "have" as used herein are intended to designate the presence of stated features, numbers, steps, constitutional elements, or combinations thereof, but it should be understood that they do not preclude the possibility of existence or adding of one or more other features, numbers, steps, constitutional elements, or combinations thereof.

Further, in the present invention, in case a layer or an element is mentioned to be formed "on" or "above" another layer or element, it means that the layer or element is directly formed on the other layer or element, or it means that another layer or element may be additionally formed between layers or on a subject or a substrate.

In the present specification, the diblock content in the styrene-butadiene-styrene triblock copolymer or the styrene-isoprene-styrene triblock copolymer means the content of a copolymer remaining in the form of a styrene-butadiene or styrene-isoprene diblock without being subjected to coupling, in the process of producing a triblock copolymer by performing a coupling reaction of a styrene-butadiene block copolymer or a styrene-isoprene copolymer.

That is, in the styrene-butadiene-styrene triblock copolymer or the styrene-isoprene-styrene triblock copolymer described herein, the polymerization reaction and the coupling reaction proceed completely, and thus it may be in a form containing only a styrene-butadiene-styrene or styrene-isoprene-styrene triblock, or it may be in the form of a mixture including a triblock, the aforementioned diblock, and unreacted monomers.

In addition, the content of a diblock in the triblock copolymer means a ratio (wt %) of the diblock contained therein relative to the total weight (100 wt %) by measuring the molecular weight distribution of the copolymer such as by GPC.

Since a variety of modifications may be made to the present invention and there may be various forms of the present invention, specific examples are illustrated and will be described in detail below.

However, it should be understood that this is not intended to limit the present invention to particular forms disclosed herein, and the invention encompasses all modifications, equivalents, or alternatives falling within the spirit and technical scope of the present invention.

In general, it is very important for the hot melt adhesive composition to secure adhesion-related physical properties such as an adhesive property, adhesive holding strength, peel strength, and the like depending on its use and properties. Such physical properties greatly vary depending on the components of the thermoplastic resin, that is, the base resin, contained in the hot melt adhesive composition.

When an olefin copolymer having a small polarity is used, it is difficult to ensure a sufficient adhesive property. When a thermoplastic elastic copolymer or the like is used, the viscosity is high and the workability may be lowered. When an amorphous alpha-olefin copolymer or the like is used, there is a disadvantage that the cohesive force is low and the workability is not good.

In the case of the styrene copolymer, the heat resistance is excellent, the viscosity is relatively low, and the workability is also excellent, and it has excellent advantages with other ingredients used together, such as tackifiers and plasticizers (oils). Of these, styrene-butadiene-styrene triblock copolymers are most preferred.

However, such physical properties may vary depending on the structural characteristics of the styrene-butadiene-styrene triblock copolymer.

In this respect, the styrene-butadiene-styrene triblock copolymer used in the hot melt adhesive composition according to one aspect of the present invention has the following features:
a1) a content of the styrene-based unit is 30 to 50 wt %,
a2) a diblock content is 55 wt % or more, and
a3) a melt flow index measured according to the ASTM D1238 standard is 30 g/10 min or more.

First, the styrene-butadiene-styrene triblock copolymer may have a styrene-based unit content of 30 to 50 wt %, preferably about 35 to about 50 wt %, and more preferably about 45 to about 50 wt %.

Since the styrene-based monomer has a glass transition temperature (Tg) value that is higher than room temperature, a hard segment unit having a relatively hard property is formed in the polymerization of the copolymer. The butadiene-based monomer has a glass transition temperature that is lower than room temperature, so a soft segment unit having a relatively soft property is formed in the polymerization of the copolymer.

Considering these properties, when the content of the styrene-based unit derived from the styrene-based monomer is too low, there may be a problem that the hardness of the hot melt adhesive composition is lowered and thus the heat resistance is lowered. Further, there may be a problem that after curing, the mechanical properties are deteriorated.

When the content of the styrene-based unit derived from the styrene-based monomer is too high, the hardness of the hot melt adhesive composition is increased and the viscosity is also increased, resulting in a problem that the processed physical properties are deteriorated and the adhesive strength is also decreased.

The styrene-butadiene-styrene triblock copolymer may have a diblock content of 55 wt % or more, preferably about 60 wt % or more, and more preferably about 60 to about 65 wt %.

In the above-mentioned styrene-butadiene-styrene triblock copolymer, when the styrene-butadiene diblock content satisfies the above range, the phenomenon that the viscosity decreases can be clearly confirmed, and due to this increase in viscosity, the adhesive strength can be improved.

Further, in the production of the hot melt adhesive composition, generally, polyolefin-based additives are used, or the content of these additives must be increased in order to impart a high softening point and flow characteristics. In this case, a problem that changes in other physical properties except for the viscosity may arise. In contrast, the present invention has an advantage that by using the above-mentioned styrene-butadiene-styrene triblock copolymer, the physical properties such as viscosity can be easily controlled and no changes in other properties occur.

The styrene-butadiene-styrene triblock copolymer may have a melt flow index measured according to the ASTM D1238 standard of 30 g/10 min or more, preferably about 40 to about 50 g/10 min, or about 45 to about 50 g/10 min.

As described above, when the melt flow index of the styrene-butadiene-styrene triblock copolymer, which is a base resin of the hot melt adhesive composition, falls within the above range, the low-temperature flowability of the hot melt adhesive composition is improved, the adhesive strength and cohesive strength are improved, and excellent workability can be obtained even at a relatively low temperature.

Meanwhile, the hot melt adhesive composition according to one aspect of the present invention further includes a styrene-isoprene-styrene triblock copolymer in addition to a styrene-butadiene-styrene triblock copolymer.

The styrene-isoprene-styrene triblock copolymer as described above allows an increase in the mechanical and thermal stability at the bonding surface formed by the hot melt adhesive composition.

In addition, the cohesive force of the adhesive composition is improved by the influence of the isoprene block existing in the block copolymer, and the tensile strength and adhesive strength can be improved as compared with the case of using the styrene-butadiene-styrene triblock copolymer alone. In addition, it is possible to impart a high softening point characteristic.

Such a styrene-isoprene-styrene triblock copolymer may have a21) a content of the styrene-based units of 30 to 50 wt %, and a22) a diblock content of less than 5 wt %, preferably less than about 1 wt %, and it may be a linear block copolymer.

In the styrene-isoprene-styrene triblock copolymer, when the diblock content is increased, the physical properties related to the melting of the triblock copolymer are excessively high, which may cause a problem of deteriorating the adhesive strength.

Due to these features, the styrene-isoprene-styrene triblock copolymer may have a melt flow index, measured according to the ASTM D1238 standard, of about 30 to about 50 g/10 min.

The hot melt adhesive composition according to one embodiment of the present invention may have a melt viscosity at 140° C. of about 7000 cPs or less, preferably about 6400 cPs or less, or about 5500 to about 6500 cPs, and a viscosity change rate at 160° C. of about 15% or less.

As described above, the hot melt adhesive composition according to one embodiment of the present invention has relatively low viscosity characteristics and the viscosity hardly changes even after aging. Thus, melt processing can be performed at a low temperature, thereby improving the processability and achieving excellent adhesive strength and heat resistance.

In addition, the hot melt adhesive composition may have a tensile strength of about 1 $N/mm^2$ or more, preferably about 1.1 $N/mm^2$ or more, and more preferably about 1.1 to about 1.5 $N/mm^2$.

Specifically, when the hot melt adhesive composition according to one embodiment of the present invention is melted and produced into a cured test specimen of a shape conforming to the ASTM D638 standard, it may have a tensile strength value as described above.

Such a tensile strength value is a physical property that can represent the durability and physical stability of an adhesive surface when the same is formed by an adhesive. The hot melt adhesive composition according to one embodiment of the present invention has tensile strength values as described above, and thus can achieve excellent adhesion durability.

The styrene-isoprene-styrene triblock copolymer may be included in an amount of about 1 to about 30 parts by weight, preferably about 10 to about 25 parts by weight, based on 100 parts by weight of the styrene-butadiene-styrene triblock copolymer.

When the content of the styrene-isoprene-styrene triblock copolymer is too small, there is a problem that the mechanical durability and thermal stability of the adhesive surface may be deteriorated, and when the content of the styrene-isoprene-styrene triblock copolymer is too high, the viscosity is increased, the adhesive properties are rather lowered, and compatibility problems between the tackifier and the styrene-butadiene-styrene triblock copolymer used together can occur.

The tackifier contained in the hot melt adhesive composition may include any one or more of an at least partially hydrogenated rosin ester-based compound and an at least partially hydrogenated dicyclopentadiene-based polymerized petroleum resin.

Herein, rosin is used as a concept that includes abietic acid, dehydroabietic acid in which hydrogen is removed from abietic acid, dihydro- or tetrahydroabietic acid in which two or four hydrogens are added to abietic acid, and abietic acid and dihydroabietic acid in which two hydrogens are added to abietic acid are used as a concept that includes all the various isomers depending on the position of the double bond.

In the case of dehydroabietic acid, it can be represented by the following formula.

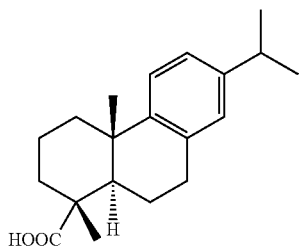 [SMILES: CC(C)c1ccc2c(c1)CC[C@H]1[C@](C)(C(=O)O)CCC[C@]21C]

That is, dehydroabietic acid has the most stable form of the aforementioned rosin compounds as two hydrogens are removed in the abietic acid structure including two double bonds to form an aromatic ring.

In the case of abietic acid, which can be seen as a basic form of the rosin-type compound, it can be represented by formula 2 shown below.

That is, abietic acid is a triple-ring compound in which two double bonds are conjugated to have a stable form. By such conjugated double bonds, unique colors are exhibited.

In addition, in the case of abietic acid, the position of the double bond can be easily changed in the above structure, which makes it possible to have various forms of isomers. Most of these isomers also have a conjugated double bond, resulting in a unique color.

In the case of dihydroabietic acid, two hydrogens are added to an abietic acid isomer to have only one double bond in the molecule, and the position of the double bond may vary depending on the isomeric structure of the abietic acid before hydrogenation.

Further, in the case of tetrahydroabietic acid in which four hydrogen atoms are added to abietic acid, hydrogen is added to all of the double bonds to have a saturated aliphatic triple-ring form, and thereby it has the features that the stability is high and the color is not exhibited, compared with abietic acid derivatives having a double bond.

That is, dehydroabietic acid has a structure in which two hydrogens are removed to form an aromatic ring in the abietic acid structure including two double bonds, resulting in the most stable form of the above rosin compounds.

In the case of abietic acid, which can be seen as a basic form of the rosin-type compound, it can be represented by the following formula.

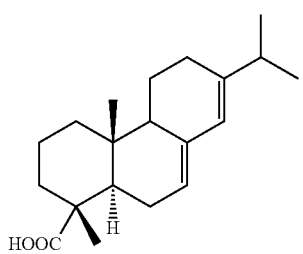 [SMILES: CC(C)C1=CC2=CC[C@H]3[C@](C)(C(=O)O)CCC[C@]3(C)C2CC1]

That is, abietic acid may be a triple-ring compound in which two double bonds are conjugated to have a stable form.

The position of these double bonds can be easily varied, thereby having various forms of isomers. Most of these isomers also have a conjugated double bond.

In the case of dihydroabietic acid, two hydrogens are added to an abietic acid isomer to have only one double bond in the molecule, and the position of the double bond may vary depending on the isomeric structure of the abietic acid before hydrogenation.

Further, in the case of tetrahydroabietic acid in which four hydrogen atoms are added to abietic acid, hydrogen is added to all of the double bonds to have a saturated aliphatic triple-ring form, and thereby it has the features that the stability is high and the color is not exhibited, compared with abietic acid derivatives having a double bond.

The above-mentioned rosin ester-based compound is obtained by esterifying a carboxyl group of abietic acid with an alcohol or an OH group of a polyol on the basis of the above-mentioned abietic acid or hydrogenated abietic acid structure. This also includes all esterified products of natural rosin or modified rosin.

The alcohol or polyol is, for example, an aliphatic alcohol having 1 to 20 carbon atoms, and may be in the form of a monoalcohol, a diol, a triol, a tetraol, or a pentanol. Specifically, it may be, for example, methanol, ethanol, glycerol, ethylene glycol, diethylene glycol, or pentaerythritol. More specifically, it may be, for example, methanol, ethanol, glycerol, ethylene glycol, diethylene glycol, pentaerythritol, or the like.

When a polyol is used, the abietic acid may cause an esterification reaction with all or a part of the hydroxyl groups of the polyol, and thereby a polyvalent ester such as a monoester, a diester, a ternary ester, or a quaternary ester can be formed.

In the tackifier used in the present invention, an at least partially hydrogenated rosin ester-based compound can be described as necessarily including one or more selected from the group consisting of the above-mentioned abietic acid, dihydroabietic acid, and tetrahydroabietic acid.

The aforementioned dicyclopentadiene-based polymerized petroleum resin refers to a petroleum resin including a C9-dicyclopentadiene prepared from C5, i.e., cyclopentadiene oil fractions, which are produced as a by-product in a naphtha cracking process in which a naphtha obtained by refining crude oil is decomposed at a high temperature.

The cyclopentadiene produced in the naphtha cracking process is, in most cases, dimerized and present as a dicyclopentadiene structure. The cyclopentadiene and its diacid, dicyclopentadiene, can be mutually converted by a Diels-Alder reaction and a retro-Diels-Alder reaction. In particular, the cyclopentadiene can be polymerized into dicyclopentadiene by thermal polymerization or catalytic polymerization.

Accordingly, the tackifier used in the present invention including an at least partially hydrogenated dicyclopentadiene-based polymerized petroleum resin may mean that hydrogen is added to at least a part of the dicyclopentadiene among the dicyclopentadiene-based compound contained in the above-mentioned dicyclopentadiene-based polymerized petroleum resin, and it includes both dicyclopentane and dicyclopentadiene.

According to one embodiment of the invention, the tackifier may be contained in an amount of about 200 to about 400 parts by weight, or about 250 to about 350 parts by weight, based on 100 parts by weight of the styrenebutadiene-styrene triblock copolymer and the styrene-isoprene-styrene triblock copolymer.

When the tackifier is contained in an excessively small amount, the tackifying effect is insufficient, and thus in the hot melt adhesive composition, the cohesion and adhesion-related physical properties are not sufficiently exhibited. When the tackifier is contained in an excessive amount, the cohesive force of the adhesive component is lowered, and the adhesion-related physical properties are deteriorated.

The plastic oil contained in the hot melt adhesive composition may include a petroleum-based mineral oil.

The petroleum-based mineral oil is a liquid by-product produced in the process of reining crude oil into petroleum, which is also called liquid paraffin. Typically, it includes a paraffinic oil based on an n-alkane, a naphthenic oil based on a cycloalkane, and an aromatic oil based on an aromatic hydrocarbon. In the present invention, the petroleum-based mineral oil is used as a concept that includes both the above-mentioned oil and the modified oil.

According to one example of the present invention, the petroleum-based mineral oil is preferably a paraffinic oil, and a white oil modified by hydrotreatment and/or dewaxing in the presence of a catalyst may be more preferred.

Specifically, the paraffinic oil modified by hydrotreatment and/or dewaxing treatment may include one or more selected from the group consisting of hydrotreated heavy paraffinic distillate (AS Registry Number 64742-54-7) or hydrotreated light paraffinic distillate (AS Registry Number 64742-55-8), solvent-dewaxed heavy paraffinic distillate (CAS Registry Number 64742-65-0), solvent-dewaxed light paraffinic distillate (CAS Registry Number 64742-56-9), hydrotreated and dewaxed heavy paraffinic distillate (CAS Registry Number 91995-39-0), and hydrotreated and dewaxed light paraffinic distillate (CAS Registry Number 91995-40-3), but the present invention is not necessarily limited thereto.

The plastic oil may be contained in an amount of about 50 to about 150 parts by weight, preferably about 70 to about 130 parts by weight, or about 90 to about 110 parts by weight, based on 100 parts by weight of the styrene-butadiene-styrene triblock copolymer and the styrene-isoprene-styrene triblock copolymer.

When the content of the plastic oil is too small, there may be a problem that the flowability and the low-temperature processability are deteriorated, and when the content of the plastic oil is too large, there may be a problem that the viscosity is excessively increased and the adhesive performance is rather lowered.

In addition, the hot melt adhesive composition according to one embodiment of the present invention may further include additives such as known light stabilizers, fillers, antioxidants, ultraviolet absorbers, and the like, if necessary.

From the viewpoint of preventing deterioration of adhesion properties, processability, and mechanical properties after bonding, these additives can be contained in an amount of about 0.1 to about 10% by weight as compared with the entire composition.

On the other hand, according to another aspect of the present invention, an adhesive member is provided, including:
  a substrate; and
  an adhesive layer formed on at least one side of the substrate and formed by the above-mentioned hot melt adhesive composition.

The adhesive member may be in the form of a film or a tape, and the substrate may be a film having a single layer or a laminated structure of two or more layers.

The substrate film may be a paper, a glass, or a nonwoven fabric, and a plastic material is preferred.

Such a plastic material is not particularly limited, and examples thereof include polyesters such as polyethylene terephthalate, polyethylene naphthalate, polybutylene terephthalate; polyolefins such as polyethylene, polypropylene, an ethylene-propylene copolymer; polyvinyl alcohol; polyvinylidene chloride; polyvinyl chloride; a vinyl chloride-vinyl acetate copolymer polyvinyl acetate; polyamide; polyimide; cellulose such as triacetyl cellulose, diacetylcellulose; a fluorine-based resin; polyether; polyether amide; polyether ether ketone; polyphenylene sulfide; a polystyrene resin such as polystyrene; polycarbonate; polyethersulfone; an acrylic resin such as polymethyl methacrylate; and the like.

Further, these materials may be used alone or in combination of two or more.

Among them, in consideration of the plastic strength, handling property, cost, dimensional stability, optical properties, and the like, polyesters, cellulose resins, acrylic resins, and the like may be preferable.

The thickness of the adhesive layer may be about 10 to about 100 μm, preferably about 30 to about 70 μm.

According to one embodiment of the invention, the adhesive member has peel strength, a T-peel strength value, according to the ASTM D1876 standard of 10 N/in or more, preferably about 10 to about 15 N/in, or about 10 to about 12 N/in, which exhibits excellent adhesive strength.

Hereinafter, the action and effect of the present invention will be described in more detail by way of examples.

However, these examples are given to merely illustrate the invention, and are not intended to limit the scope of the invention thereto.

Example 1

Styrene-Butadiene-Styrene Triblock Copolymer

Preparation Example 1

5000 g of cyclohexane was added to a high-pressure reactor, and 400 g of styrene was added thereto. Then, the temperature of the reactor was raised to about 60° C. while stirring at about 400 rpm.

As the catalyst, 50 g of n-butyllithium (3 wt % in cyclohexane) was added, and the solution polymerization reaction was carried out while raising the temperature to about 130° C. under a pressure of about 5 kgf/cm$^2$.

About 5 minutes after the reaction temperature reached 130° C., the mixture was cooled to 60° C., and 700 g of butadiene was added while maintaining the temperature. The polymerization reaction was carried out while raising the temperature to 130° C. under a pressure of about 5 kgf/cm$^2$.

When the reactor temperature showed the maximum temperature, it was judged that the butadiene reaction was terminated like the styrene reaction.

About 5 minutes after the reaction temperature reached 130° C., the same equivalent weight of a coupling agent (KA-22, manufactured by Shin-Etsu) as n-butyllithium was added and the reaction proceeded for a further 5 minutes, to prepare a triblock copolymer.

Subsequently, about 0.1 g of water was added to terminate the reaction.

Preparation Example 2

Globalprene 3545 (LCY Chemical Corp.), which is a styrene-butadiene-styrene triblock copolymer, was prepared.

Preparation Example 3

Taipol 4270 (TSRC Corp.), which is a styrene-butadiene-styrene triblock copolymer, was prepared.

The characteristics of the styrene-butadiene-styrene triblock copolymer of the preparation examples are summarized in Table 1 below.

TABLE 1

|  | Styrene content (wt %) | MI g/10 min (ASTM D1238, 190° C./5 kg) | Diblock content (wt %) |
|---|---|---|---|
| Preparation Example 1 | 45 | 46.3 | 62 |
| Preparation Example 2 | 44.5 | 46.9 | 63 |
| Preparation Example 3 (4270) | 36 | 22 | 70 |

Styrene-Isoprene-Styrene Triblock Copolymer

Preparation Example 4

Vector 4411 (TSRC Corp.), which is a styrene-isoprene-styrene triblock copolymer, was prepared.

Preparation Example 5

Vector 4113 (TSRC Corp.), which is a styrene-isoprene-styrene triblock copolymer, was prepared.

The characteristics of the styrene-isoprene-styrene triblock copolymer of the preparation examples are summarized in Table 2 below.

TABLE 2

|  | Styrene content (wt %) | MI g/10 min (ASTM D1238, 190° C./5 kg) | Diblock content (wt %) |
|---|---|---|---|
| Preparation Example 4 | 44 | 40 | ~about 0 |
| Preparation Example 5 | 15 | 11 | 18 |

Production of Hot Melt Adhesive Composition

Kaydol (Sonneborn), which is a white mineral oil as aplastic oil, Escorez 5600 (ExxonMobil), which is a hydrogenated dicyclopentadiene-based polymerized petroleum resin as a tackifier, Irganox 1010 as an antioxidant, Irgafos 168 as a stabilizer, and Tinuvin P (BASF) as a ultraviolet absorber were added to a 1 L glass beaker, and heated in a convection oven at 150° C. for about 30 minutes.

Then, the glass beaker was fixed to a heating mantle at 150° C., and stirred at 100 rpm. After the temperature inside the beaker reached 150° C., the speed was increased to 150 rpm and additional stirring was carried out.

The styrene-butadiene-styrene triblock copolymer and the styrene-isoprene-styreneiblockcopolymeroftheprepara-tionexampleswereCslowlyaddeddropwise thereto. The mixture was stirred at speed of 200 rpm for 4 hours to completely dissolve the styrene-butadiene-styrene triblock copolymer. Thereby, a hot melt adhesive composition was produced.

The composition of the hot melt adhesive composition is shown in Table 3 below.

TABLE 3

| Component (unit: parts by weight) | Example 1 | Example 2 | Comparative Example 1 |
|---|---|---|---|
| SBS | Preparation Example 1/25 | Preparation Example 2/25 | Preparation Example 3/24 |
| SIS | Preparation Example 4/5 | Preparation Example 4/5 | Preparation Example 5/1 |
| Tackifier | 55 | 55 | 65 |
| Plastic oil | 14 | 14 | 9 |
| Irganox 1010 | 0.6 | 0.6 | 0.6 |
| Irgafos 168 | 0.2 | 0.2 | 0.2 |
| Tinuvin P | 0.2 | 0.2 | 0.2 |

Production of Adhesive Member

The hot melt adhesive compositions of the examples and comparative examples were heated at 180° C. for 5 minutes to confirm the melting. This was applied to a PET substrate with an applicator at 180° C., and then coated using a blade so that the thickness of the adhesive layer was 50 μm. The same PET substrate was bonded with a cover film at the same time to produce an adhesive member.

Experimental Example

Measurement of Viscosity

About 10 g of the hot melt adhesive composition was added to a sample chamber, and the viscosities at 140° C. and 160° C. were measured for 30 minutes using a Brookfield viscometer (DV2+Model, Spindle Number 27).

Thereafter, the hot melt adhesive composition was allowed to stand under the same conditions for 24 hours, and the viscosity was measured in the same manner and the viscosity reduction rates at 140° C. and 160° C. were calculated.

(Related Standard: ASTM D4402).

Measurement of Softening Point

Using Automatic Softening Point Analyzer RB 365G Model, the above hot melt adhesive composition was thoroughly placed in a ring and allowed to stand for 1 hour, and a ball (diameter: 9.525 mm, weight: 3.5 g) was placed thereon.

The sample was heated while raising the temperature at a rate of 5° C./min, and the temperature when the ball was titled 1 inch was measured.

(Related standard: ASTM D36).

Measurement of Adhesive Physical Property

The adhesive strength of the adhesive member produced above was measured by a T-peel method using a Texture Analyzer (TA).

The adhesive member samples were cut into a width of 1 inch and a length of 100 mm, and were measured under a speed condition of 0.3 m/min at room temperature.
(Related Standard: ASTM D1876.

Measurement of Tensile Strength

After the hot melt adhesive composition was melted, a test specimen was prepared according to the ASTM D638 Type-IV standard, and the tensile strength was measured.
(Related Standard: ASTM D638).
The measured values are summarized in Table 4 below.

TABLE 4

|  | Unit | Example 1 | Example 2 | Comparative Example 1 |
| --- | --- | --- | --- | --- |
| Adhesive property | N/in | 12.8 | 12.6 | 15 |
| Softening point | ° C. | 89.5 | 89 | 88 |
| Viscosity (140° C.) | cPs | 5875 | 6250 | 8400 |
| Viscosity reduction rate (140° C., 24 h) | % | 3 | 7 | 10 |
| Viscosity (160° C.) | cPs | 2413 | 2675 | 3250 |
| Viscosity reduction rate (160° C., 24 h) | % | 10 | 13 | 21 |
| Tensile strength | N/mm$^2$ | 1.31 | 1.18 | 0.85 |

Referring to Table 3, it can be seen that in the case of the hot melt adhesive composition according to Examples of the present invention, the softening point is higher than that of Comparative Examples and the low viscosity property is exhibited.

In addition, it can be clearly confirmed that at a temperature of about 140° C. or about 160° C., which can be seen as a usual temperature for general adhesives, the change in viscosity is very small and excellent adhesion stability can be realized. At the same time, it has a tensile strength value that is improved by about 50% or more as compared with the comparative examples, and it is expected that the durability and mechanical properties of the adhesion surface are excellent.

The invention claimed is:
1. An adhesive member comprising:
a substrate; and
an adhesive layer formed on at least one side of the substrate,
wherein the adhesive layer is formed by a hot melt adhesive composition comprising:
A1) a styrene-butadiene-styrene triblock copolymer, wherein
a1) a content of the styrene-based unit is 30 to 50 wt %,
a2) a diblock content is 60 to 65% by weight, and
a3) a melt flow index measured according to ASTM D1238 at 190° C./5 kg is 30 g/10 min or more;
A2) a styrene-isoprene-styrene triblock copolymer, wherein
a21) a content of the styrene-based unit is 30 to 50 wt %,
a22) a diblock content is less than 5% by weight, and
a23) a melt flow index measured according to ASTM D1238 at 190° C./5 kg is 30 to 50 g/10 min;
B) a tackifier; and
C) a plasticizing oil,
wherein the hot melt adhesive composition has a softening point measured according to the ASTM D36 standard of 85° C. or higher, and
wherein the hot melt adhesive composition has a melt viscosity at 140° C. of 7000 cPs or less, and a viscosity change rate at 160° C. of 15% or less, and
wherein the tackifier is included in an amount of 200 to 400 parts by weight based on 100 parts by weight of the styrene-butadiene-styrene triblock copolymer and the styrene-isoprene-styrene triblock copolymer and
wherein a thickness of the adhesive layer is 10 to 100 μm.

2. The adhesive member according to claim 1, wherein the hot melt adhesive composition has a tensile strength value of 1 N/mm$^2$ or more when preparing a test specimen according to the ASTM D638 standard.

3. The adhesive member according to claim 1, wherein the tensile strength value of the hot melt adhesive composition is 1.1 N/mm$^2$ to 1.5 N/mm$^2$.

4. The adhesive member according to claim 1, wherein the styrene-isoprene-styrene triblock copolymer is included in an amount of 1 to 30 parts by weight, based on 100 parts by weight of the styrene-butadiene-styrene triblock copolymer.

5. The adhesive member according to claim 1, wherein the tackifier includes one or more of an at least partially hydrogenated rosin ester-based compound or an at least partially hydrogenated dicyclopentadiene-based polymerized petroleum resin.

6. The adhesive member according to claim 1, wherein the plasticizing oil includes a petroleum-based mineral oil.

7. The adhesive member according to claim 1, wherein the plasticizing oil is included in an amount of 50 to 150 parts by weight based on 100 parts by weight of the styrene-butadiene-styrene triblock copolymer and the styrene-isoprene-styrene triblock copolymer.

8. The adhesive member according to claim 1, wherein the adhesive member has a T-peel strength value according to the ASTM D1876 standard of 10 N/in or more.

9. The adhesive member according to claim 8, wherein the T-peel strength value of the adhesive member according to the ASTM D1876 standard is about 10 N/in to about 15 N/in.

10. The adhesive member according to claim 1, wherein the diblock content in the styrene-isoprene-styrene triblock copolymer is less than 1 wt % by weight.

11. The adhesive member according to claim 1, wherein the melt flow index of the styrene-butadiene-styrene triblock copolymer measured according to ASTM D1238 is about 40 g/10 min to about 50 g/10 min.

12. The adhesive member according to claim 1, wherein the melt viscosity at 140° C. of the hot melt adhesive composition is about 5500 cps to 6500 cps.

* * * * *